United States Patent [19]

Ehemann, Jr.

[11] Patent Number: 4,488,793

[45] Date of Patent: Dec. 18, 1984

[54] PHOTODEPOSITING A CRT SCREEN STRUCTURE USING DISCRETE-ELEMENT OPTICAL FILTER

[75] Inventor: George M. Ehemann, Jr., Lancaster, Pa.

[73] Assignee: RCA Corporation, New York, N.Y.

[21] Appl. No.: 452,797

[22] Filed: Dec. 23, 1982

[51] Int. Cl.[3] .......... G03B 41/00

[52] U.S. Cl. .......... 354/1

[58] Field of Search .......... 354/1; 430/24

[56] References Cited

U.S. PATENT DOCUMENTS

| | | | |
|---|---|---|---|
| 3,592,112 | 7/1971 | Frey | 95/1 |
| 3,809,558 | 5/1974 | Yamazaki et al. | 354/1 X |
| 3,982,252 | 9/1976 | Yamazaki et al. | 354/1 |
| 4,132,470 | 1/1979 | van Heek | 354/1 |
| 4,157,215 | 6/1979 | Hanak | 354/1 |

FOREIGN PATENT DOCUMENTS

| | | |
|---|---|---|
| 1481979 | 8/1977 | United Kingdom . |
| 1521869 | 8/1978 | United Kingdom . |
| 1562093 | 3/1980 | United Kingdom . |

*Primary Examiner*—John Gonzales

*Attorney, Agent, or Firm*—E. M. Whitacre; D. H. Irlbeck; L. Greenspan

[57] ABSTRACT

Method for photodepositing a CRT screen structure including projecting a light field through an IC filter having tailored light transmission, through a photographic master and incident upon a photosensitive layer. The IC filter is a half-tone comprising an array of discrete spaced-apart opaque elements of predetermined sizes arranged along parallel spaced-apart lines.

6 Claims, 7 Drawing Figures

Fig. 6
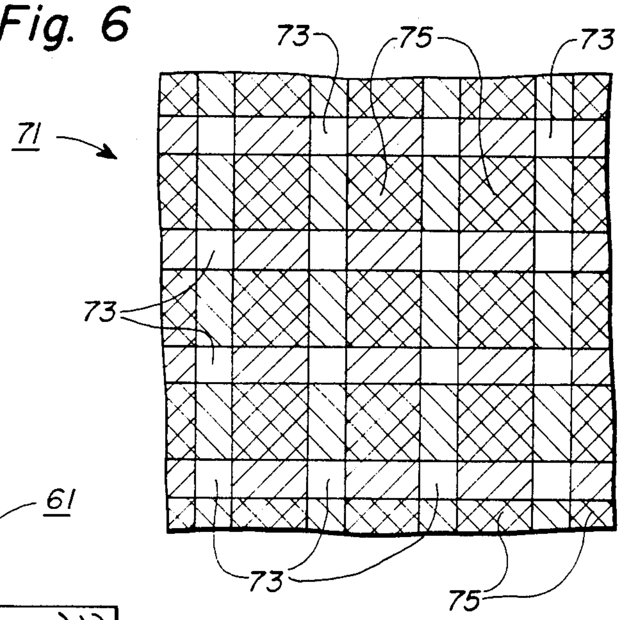
Fig. 5
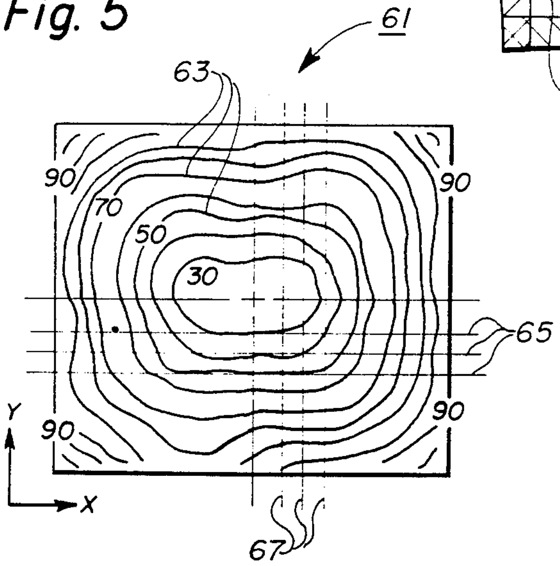
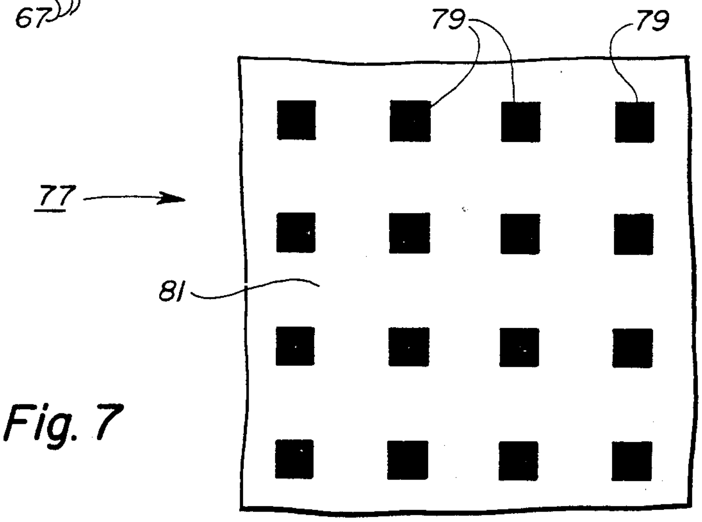
Fig. 7

PHOTODEPOSITING A CRT SCREEN STRUCTURE USING DISCRETE-ELEMENT OPTICAL FILTER

BACKGROUND OF THE INVENTION

This invention relates to a novel method for photodepositing a viewing-screen structure for a CRT (cathode-ray tube), particularly for a multibeam color display tube. The screen structure can be, for example, a light-absorbing matrix or luminescent elements of the viewing screen.

A color television tube, which is a type of CRT, comprises an evacuated glass envelope including a faceplate panel having a viewing window, a viewing screen on the inside surface of the window, and means for selectively exciting elements of the screen to luminescence. In one type of picture tube, the viewing screen is comprised of interlaced elements having different light-emission characteristics. Also, the tube includes an apertured shadow mask closely spaced from the viewing screen. The mask is part of the means for selectively exciting the viewing screen, and also is used as a photographic master for depositing the screen structure.

A typical process for fabricating the screen structure includes three photographic exposures, one for defining the elements of each of three different luminescent fields. Each exposure involves projecting a light field from a light source, through a light-refracting lens, an IC (intensity-correcting) filter, and a photographic master incident on a photosensitive layer that is supported on the inside surface of the viewing window. The exposures differ in that the panel is displaced laterally for each exposure relative to the axis of the lens.

Because of the optical characteristics of the system, the brightness of the unfiltered light field drops off from center to edge. To compensate for this, the transmission of the IC filter increases from center to edge. And, because it is desirable for screen elements to decrease in size from center to edge, the filter produces a brightness profile at the photosensitive layer which produces the desired distribution of screen-element sizes. The filtered light field may drop off in brightness from center to edge, but not as sharply as for the unfiltered light field. And, the brightness of the light field varies according to prescribed profiles. One particularly useful optical IC filter that can be used for this purpose is disclosed in U.S. Pat. No. 4,132,470 to H. F. van Heek issued Jan. 2, 1979. That filter, which is referred to in the art as a half-tone line-pattern IC filter, includes a transparent plate and a multiplicity of opaque, substantially-parallel, spaced stripes or lines. The filter has local regions of prescribed optical transmissions produced by variations in the widths of the stripes in those regions. That IC filter can be made with an optical drawing machine by drawing parallel spaced stripes of substantially uniform pitch therebetween but of varying widths according to a mathematical prescription. Working filters are then made by contact printing with the optically-drawn masters.

The above-described IC filter can be made reliably with lines having a 15-mil pitch and a minimum width of about 1.5 mils, whereby a maximum transmission of about 90% is realized. Where a relatively-long exposure is required for photodepositing a CRT screen structure, it is desirable to use a filter with a higher maximum transmission in order to shorten the required exposure time. Also, it is desirable to employ a filter having opaque elements that are arranged along lines with smaller pitch therebetween in order to reduce the vestige of filter line structure in the CRT viewing screen structure.

SUMMARY OF THE INVENTION

In common with prior methods, the novel method comprises projecting a light field through an IC filter, through a photographic master and incident upon a photosensitive layer. In the novel method, the IC filter is a half-tone comprising an array of discrete, spaced-apart opaque elements or areas of predetermined sizes arranged along parallel spaced-apart lines. The opaque areas may be substantially rectangular and are preferably substantially square in shape. Unlike half-tone line-pattern IC filters previously used in similar methods, both the lengths and the widths of the opaque elements can be adjusted in size to provide prescribed optical transmissions in local regions of the filter.

By using a half-tone IC filter with discrete spaced-apart opaque elements as described above instead of spaced-apart opaque stripes as in prior methods, the maximum transmission in local areas of the filter can be increased from about 90% to about 99% of the incident light, permitting a reduction of at least 10% in the exposure time required for depositing a CRT screen structure. Also, by using discrete spaced-apart opaque elements along parallel lines, instead of parallel solid opaque strips, the opaque elements can be arranged along parallel lines with smaller pitch therebetween. This feature can be traded off for part or all of the benefit in increased maximum transmission.

BRIEF DESCRIPTION OF THE DRAWINGS

FIG. 5 is a plan view of a plot of the desired light transmission for a novel IC filter.

FIG. 6 is a plan view of a fragment of the photosensitive layer used for making a negative master of the desired IC filter just after contact exposure from two different ruled masters.

FIG. 7 is a plan view of a fragment of the IC filter made from the negative master fragment shown in FIG. 6.

DETAILED DESCRIPTION OF THE PREFERRED EMBODIMENTS

Figure 1:
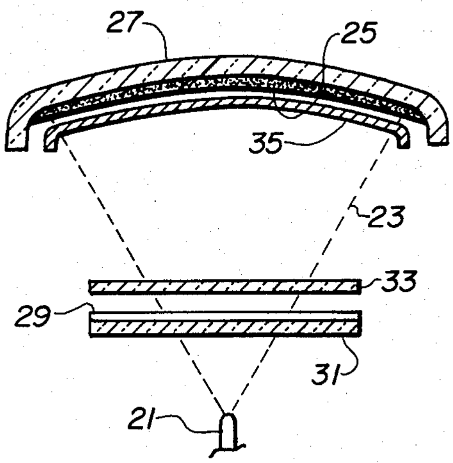
FIG. 1 is a schematic sectional view of an exposure lighthouse that may be employed for practicing the novel method.

The novel method may be practiced with the exposure lighthouse shown in FIG. 1. The lighthouse includes a light source 21 which projects a light field 23 towards a light-sensitive layer 25 supported on the inner surface of the faceplate panel 27 of a CRT. The light field 23 passes through an IC filter 29 carried on a clear glass support 31 and through a correction lens 33 which is an optical refractor, and through a photographic master 35 which, in this case, is an apertured mask mounted in the panel 27. Except for the IC filter, the novel method and equipment for practicing the novel method are adequately described elsewhere in the patent literature, so a detailed description herein is unnecessary. For the purposes of exemplifying the novel method, the exposure lighthouse described in U.S. Pat. No. 3,592,112 to H. R. Frey issued July 13, 1971 is used in the preferred embodiment. However, many variations can be made in that lighthouse other than changing the IC filter without departing from the spirit of the novel method. For example, as is known in the art, other light sources, lenses, and photosensitive layers can be used.

Figure 2:
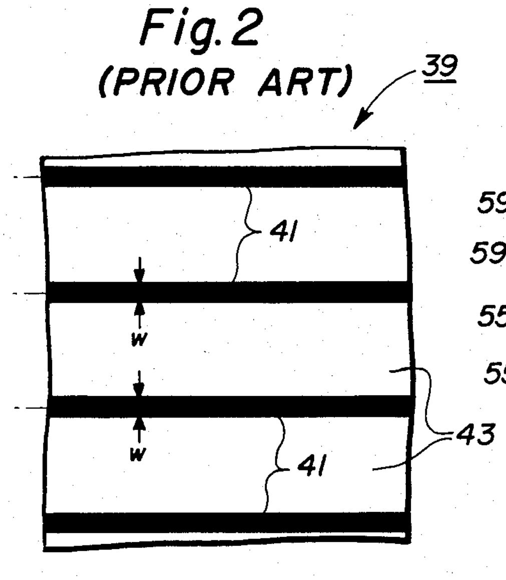
Fig. 2 (PRIOR ART)
FIG. 2 is a plan view of a fragment of a prior-art line-pattern half-tone IC filter.

A fragment of a typical line-pattern IC filter 39 used in prior processes, shown in FIG. 2, comprises parallel opaque lines or stripes 41 on a transparent support 43. The stripes 41 are on about 15-mil centers and vary in width w from about 1.5 to 13.5 mils according to a prescription designed to provide the desired light transmission in local regions of this first IC filter 39. At the minimum width of 1.5 mils, which is about the smallest dimension of line width w that can be reliably made by an optical drawing machine, the local region has a transmission of about 90%. The first IC filter 39 is usually used to fabricate line-type CRT viewing screen structures. In such fabrication processes, the stripes 41 of the first filter 39 are normal to the lines of the screen structure being deposited, and the first filter 39 moves during the photographic exposure relative to the screen structure in the direction of the lines of the screen structure in order to wash out the vestiges of the line structure in the first filter 39.

Figure 3:
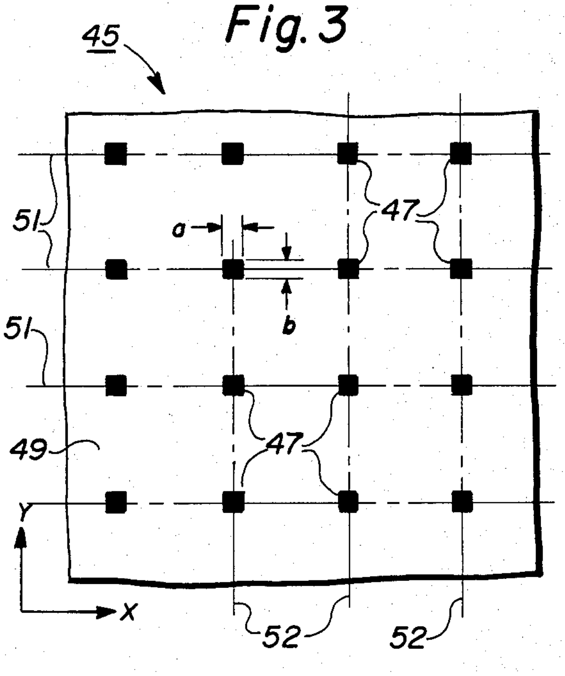
FIG. 3 is a plan view of a fragment of a novel discrete-element half-tone IC filter with relatively long pitch in both the x and y directions of the filter.

FIG. 3 shows a fragment of a discrete-element IC filter 45 that may be used in the novel method. This second IC filter 45 comprises substantially square, opaque elements 47 on a transparent support 49. The square elements 47 are substantially uniformly spaced from one another along parallel center lines 51 and 52 that are about 15 mils apart in both the x and y directions. The elements 47 vary in size from about 1.5 to 13.5 mils on a side. While the pitch is shown to be the same in both the x and y directions, it may be different in these two directions. With the second filter 45 shown, when the discrete elements 47 are at their minimum width a (x-direction) and length b (y-direction) of 1.5 mils, the local region has a transmission of about 99%. This permits a reduction in exposure time of about 10% as compared with the first filter 39 shown in FIG. 2. The second IC filter may be used in the same manner as the first filter 39 shown in FIG. 2.

Figure 4:
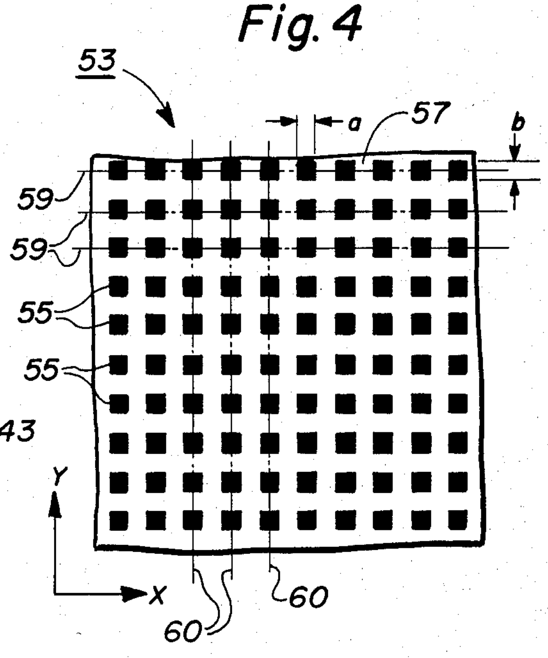
FIG. 4 is a plan view of a fragment of a novel discrete element half-tone IC filter with relatively short pitch in both the x and y directions.

FIG. 4 shows a fragment of an alternative discrete-element IC filter 53 that may be used in the novel method. This third IC filter 53 comprises substantially-square opaque elements 55 on a transparent support 57. These elements 55 are located on center lines 60 that are spaced about 5 mils from one another and along parallel center lines 59 that are spaced about 5 mils apart. The elements 55 vary in size from about 1.5 to 4 mils on a side. With the third filter 53 shown, when discrete elements 55 are at the minimum width a and length b of 1.5 mils, the local regions have a transmission of about 90%. This permits the third IC filter 53 to be used during photographic exposure without movement with respect to the screen structure that is being fabricated. This is significant in fabricating dot screen structures; such as, screens comprising a hexagonal array of luminescent elements. But, the exposure time is not shortened.

An example of a procedure for producing a discrete-element IC filter that is useful in the novel method is described with respect to FIGS. 5, 6 and 7. FIG. 5 shows a plot 61 of the desired light transmission in the working filter. The contour lines 63 are for points of equal light transmission in percent. The grading or variation in light transmission is smooth and continuous. The transmission profiles along spaced parallel lines 65 of known pitch in the x direction are fed to an optical drawing machine, and a line pattern (similar to that shown in FIG. 2) is generated; that is, the width of each line varies according to the desired transmission with greater transmission producing a narrower portion of the line. The transmission profiles along spaced parallel lines 67 of known pitch in the y direction are fed to an optical drawing machine, and a second line pattern is generated. The optical drawing machine exposes a photosensitive layer line by line, and then the layer is developed to produce opaque lines on a clear background.

Referring to FIG. 6, a negative IC master filter 71 is made by contact exposure of a photosensitive layer with each of the drawn line masters. This is done sequentially, and then the photosensitive layer is developed. In FIG. 6, the exposure with the master with the y-direction lines or stripes exposes the areas that are cross hatched upper right to lower left. The exposure with the master with the x direction lines or stripes exposes the areas that are cross hatched upper left to lower right. Where the x-direction and y-direction stripes cross, there are first squares 73 where no exposure takes place. Diagonally between these first squares 73 are second squares 75 that are doubly exposed. Upon development, the first squares 73 become transparent, whereas all the remainder of the layer is opaque, thereby producing the negative IC master. The positive IC master filter 77 shown in FIG. 7 is then produced by photographically contact-printing from the negative IC filter 71. As stated previously, the positive IC filter comprises an array of discrete spaced-apart opaque elements 79 arranged along parallel spaced-apart lines on a transparent support 81.

The a and b dimensions of the discrete opaque elements, in the x and y directions respectively, are related by the expression $$a=(1-T)c^2/b$$

where T is the transmission in the local region of the filter, and c is the pitch between rows of elements in either direction. If square elements are printed, then $$a=b=c\sqrt{1-T}$$

There are several advantages to the use of a discrete-element half-tone IC filter in the noval method. Higher transmissions can be achieved, which can result in shorter lighthouse exposures. Fewer lighthouses can therefore be required in the factory. The highest transmission possible with continuous-tone IC filters is about 70%. This design limit is due to poor film adherence of thin films in the areas requiring high film transmission. For line-pattern half-tone IC filters, the optical transmission T in local regions of the filter is approximately (1−a/c), where a is the line width and c is the pitch between lines. The maximum transmission T in local regions of a line-pattern IC filter is limited by the smallest controllable line width which can be plotted. Typically, with a minimum a=1.5 mils and a pitch c=15 mils, the highest theoretical transmission is about 90% for line-pattern half-tone patterns. For discrete-element half-tone IC filters using square elements, the optical transmission in local regions is given by the expression $(1-a^2/c^2)$. The maximum theoretical transmission in local regions is about 99% for the above values of a and c. The theoretical maximum transmission can be achieved in practice.

Another advantage of the use of a discrete-element half-tone IC filter is its feasibility for printing dot screens. The line pattern of a line-pattern half-tone IC filter cannot be used for dot screens because the lighthouse source is a small rectangle which projects the line pattern of the filter visibly into the printed screen structure. A discrete-element half-tone IC filter leaves no trace of its pattern on the printed screen structure when used in combination, even with a stationary small source.

What is claimed is:

1. In a method for photodepositing a screen structure for a CRT including projecting a light field (a) through a light-transmission IC filter, said filter having tailored variations of light transmission for producing predetermined variations in light intensity in said light field, (b) through a photographic master and (c) incident upon a photosensitive layer, the improvement wherein said filter comprises an array of discrete, spaced-apart, opaque elements of predetermined sizes no less than about 1.5 mils in their smallest dimensions arranged along parallel uniformly spaced-apart lines that are no more than about 15 mils apart.

2. The method defined in claim 1 wherein said elements are substantially rectangular.

3. The method defined in claim 1 wherein said elements are substantially square.

4. The method defined in claim 1 wherein said lines are spaced apart no more than about 5 mils apart.

5. The method defined in claim 1 wherein said filter is stationary with respect to said layer and said light field during the time said light field is incident on said layer.

6. The method defined in claim 1 wherein both the lengths and the widths of said opaque elements are adjusted in size to provide prescribed light transmissions in local regions of said filter.

* * * * *